United States Patent
Bestmann (10) Patent No.: US 7,506,584 B2
(45) Date of Patent: Mar. 24, 2009

(54) METHOD FOR PRODUCING A PROOF FOR A PRINTING PROCESS HAVING MORE THAN FOUR PRINTING INKS

(75) Inventor: Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 645 days.

(21) Appl. No.: 11/039,030

(22) Filed: Jan. 20, 2005

(65) Prior Publication Data

US 2005/0179727 A1 Aug. 18, 2005

(30) Foreign Application Priority Data

Jan. 22, 2004 (DE) .................. 10 2004 003 300

(51) Int. Cl.
*H04N 1/60* (2006.01)
(52) U.S. Cl. ....................... 101/483; 358/1.9
(58) Field of Classification Search ............... 101/483, 101/484; 358/515, 518, 523; 382/162, 167
See application file for complete search history.

(56) References Cited

U.S. PATENT DOCUMENTS

| | | | |
|---|---|---|---|
| 4,870,455 A * | 9/1989 | Morgan, Jr. .................. 355/77 |
| 5,564,006 A | 10/1996 | Reed |
| 5,734,800 A * | 3/1998 | Herbert et al. ............... 358/1.9 |
| 5,845,056 A | 12/1998 | Kohler et al. |
| 6,483,607 B1 | 11/2002 | Van de Capelle et al. |
| 6,742,869 B2 * | 6/2004 | Redding et al. ............... 347/43 |
| 7,032,517 B2 * | 4/2006 | Bestmann .................... 101/484 |
| 7,164,498 B2 * | 1/2007 | Van Bael ..................... 358/1.9 |
| 7,295,703 B2 * | 11/2007 | Bala et al. .................... 382/165 |
| 2003/0058291 A1 | 3/2003 | Pinard et al. |
| 2004/0080765 A1 | 4/2004 | Nishide et al. |
| 2004/0114163 A1 * | 6/2004 | Alderliefste ................ 358/1.9 |

FOREIGN PATENT DOCUMENTS

| | | |
|---|---|---|
| EP | 0 675 636 A2 | 10/1995 |
| EP | 1 207 684 A2 | 5/2002 |
| WO | 96/27976 | 9/1996 |

* cited by examiner

*Primary Examiner*—Daniel J Colilla
(74) *Attorney, Agent, or Firm*—Laurence A. Greenberg; Werner H. Stemer; Ralph E. Locher (57) ABSTRACT

A method for producing a proof, having proof printing inks cyan-P, magenta-P, yellow-P, black-P, for an edition printing process, and primary printing inks CMYK and a secondary printing ink RGB, converts edition printing process printing inks with association tables into proof printing process printing inks, for combinations of input color components, associated output color components being stored in the association tables. Reducing storage requirement of association tables having >four input color components is done by dividing into a plurality of association tables. Up to four printing inks are printed in the edition printing process during color separation for the edition printing process by GCR and CCR application. Factors of gray and color component replacement are chosen as a function of chroma of a color to be printed. CCR is applied only to a color to be printed to which a GCR with a factor of 100% has already been applied.

22 Claims, 11 Drawing Sheets

METHOD FOR PRODUCING A PROOF FOR A PRINTING PROCESS HAVING MORE THAN FOUR PRINTING INKS

BACKGROUND OF THE INVENTION

Field of the Invention

The invention pertains to the field of electronic reproduction technology and relates to a method for producing a proof for a printing process having more than four printing inks. Proofs have the task of carrying out monitoring of the content and the color reproduction of a printed sheet or parts of a printed sheet before the start of the edition printing. The colors of a proof must coincide as exactly as possible with the colors to be achieved subsequently in the print so that it can be used as an obligatory color original for the printer.

In reproduction technology, printing originals for printed pages that contain all the elements to be printed such as texts, graphics and images are produced. For color printing, a separate printing original is produced for each printing ink and contains all the elements that are printed in the respective color. For four-color printing, these are the printing inks cyan (C), magenta (M), yellow (Y) and black (K). The printing originals separated in accordance with printing inks are also referred to as color separations. The printing originals are generally scanned and, by using an exposer, are exposed onto films, with which printing plates for printing large editions are, then, produced. Alternatively, the printing originals can also be exposed directly onto printing plates in special exposure devices or they are transferred directly as digital data to a digital press. There, the printing-original data is, then, exposed onto printing plates, for example, with an exposing unit integrated into the press, before the printing of the edition begins immediately thereafter. There are also digital presses that do not need any printing plates because, for example, they operate in accordance with the electrophotographic printing principle or with inkjet printing.

According to the current prior art, the printing originals are reproduced electronically. In such a case, images are scanned in a color scanner and stored in the form of digital data. Texts are generated with text processing programs and graphics with drawing programs. Using a layout program, the image, text, and graphic elements are assembled to form a printed page. The data from a plurality of printed pages is combined with the data from further elements, such as register crosses, cutting marks and folding marks and print control fields, to form printing originals for a printed sheet. The data formats largely used nowadays to describe the printing originals are the page description languages PostScript and PDF (portable document format). The PostScript or PDF data is converted in a raster image processor (RIP) into color separation values for the color separations C, M, Y, and K before the recording of the printing originals. In the process, for each image point, four color separation values are produced as tonal values in the value range from 0 to 100%. The color separation values are a measure of the color densities with which the four printing inks cyan, magenta, yellow, and black are printed on the printing material. In special cases, in which printing is carried out with more than four printing inks (decorative colors), each image point is described by as many color separation values as there are printing inks. The color separation values can be stored, for example, as a data value with 8 bits for each image point and printing ink, with which the value range from 0% to 100% is subdivided into 256 tonal value steps.

At various stages in the working sequence for a reproduction, a proof is produced or what is known as a soft proof is displayed on a monitor. If the proof includes an entire printed sheet, containing all the elements to be printed, such as images, texts, graphics, register crosses, folding and cutting marks, and so on, it is used primarily to check whether or not all the elements of the printed sheet are disposed correctly and whether or not they are complete in their entirety. The production of a proof for individual images or printed pages, of which the colors coincide as exactly as possible with the colors to be achieved subsequently in the print, is also usual so that it can be used as an obligatory color original for the printer. Often, an obligatory color proof is also a constituent part of a contract for a print job. Such a proof has high economic significance because the repetition of a print job because of a lack of agreement with the proof entails high costs.

The colors of the elements of a printed page are usually not defined directly in the CMYK color system of the printing inks but, as a rule, in another color system. For example, the images are broken down in a scanner by color filters into the color components red, green, and blue (RGB), that is to say, into the components of a three-dimensional color space. Therefore, before the printing originals are recorded on color separation films or printing plates, the image data, therefore, has to be transformed from the RGB color space of the scanner into the CMYK color space of the printing process to be used.

Such color space transformations are needed in reproduction technology because the devices and processes used have specific restrictions and special features in the display and reproduction of the colors and these properties are different in all the devices and processes. Therefore, for different devices and processes such as scanners, monitors, proofers, and printing processes and so on, there are different color spaces, which in each case describe the color characteristics of the device or process in an optimum manner and which are designated device dependent color spaces. In addition to the device dependent color spaces there are also device independent color spaces, which are based on the human viewing characteristics of what is known as a standard observer. Such color spaces are, for example, the XYZ color space defined by the CIE standardization commission (Commission Internationale d'Éclairage) or the Lab color space derived therefrom, the Lab color space having gained wider acceptance in the technology. If it is wished to know whether two colors will be perceived as identical or different by the human eye, then the measurement of the XYZ or Lab color components is sufficient for this purpose. The Lab color components form a three-dimensional color space having a lightness axis (L) and two color axes (a, b), which can be imagined in the plane of a color circle, through whose center the lightness axis runs. The Lab color components are related to the XYZ color components through nonlinear conversion equations.

A device or color processing process can be characterized with respect to its color characteristics by assigning all the possible value combinations of the associated device dependent color space the Lab color components that a human sees in the colors produced with these value combinations. For a printing process, the various CMYK value combinations in each case produce a different printed color. Using a color-measuring instrument, the Lab components of the printed colors can be determined and assigned to the CMYK value combinations. Such an assignment, which relates the device dependent colors produced by a device or process to a device independent color space (XYZ or Lab), is also designated a color profile, an output color profile in the case of a printing process. The definition and data formats for color profiles have been standardized by the ICC (International Color Consortium—Specification ICC.1:2003-09). In an ICC color profile, the association between the color spaces is stored in both directions, for example, the assignment Lab=f1 (CMYK) and the inverse assignment CMYK=f2 (Lab). The assignment defined by a color profile can be implemented with the aid of a look-up table. If, for example, the CMYK color components of a printing process are to be assigned the Lab color components, the look-up table must have sufficient space, in which the associated Lab color components are stored for each possible value combination of the CMYK color components. However, this simple association method has the disadvantage that the look-up table can become very large. If each of the CMYK color components has 256 tonal value steps, there are $256^4$=4,294,967,296 possible value combinations of the CMYK color components. The look-up table must therefore have 4,294,967,296 storage cells with six bytes word length (two bytes each for L, a, b). To reduce the size of the look-up table, a combination of look-up table and interpolation method is, therefore, used to describe a color profile and to implement an appropriate color space transformation. In the look-up table, only the associated Lab components for a coarser, regular grid of reference cells in the CMYK color space are stored. For CMYK value combinations that lie between the grid points, the Lab color values to be assigned are interpolated from the stored Lab color values of the adjacent reference points.

To transform the RGB color values of a scanned image into the CMYK color values of the printing process, the association tables of a scanner color profile and of a printing process color profile are applied one after the other. First of all, the RGB color values are converted by the scanner color profile into the device independent Lab color values. These are, then, converted by the printing process color profile into the CMYK color values of the printing process. Alternatively, the two color profiles can also be linked in advance to form a conversion color profile, whose tables contain the direct assignment of the RGB color values to the CMYK color values. Because the RGB color values and the CMYK color values that result in the same Lab color values are in each case associated with one another through the device independent Lab intermediate color space, the associated colors are perceived as visually identical. However, this assignment is only possible within the restricted color gamut that can be printed with the CMYK printing inks. If the color gamut of the RGB color values of a scanned image is larger, such as is the case for color slides, for example, it is not possible for all the colors of the image to be reproduced exactly with the CMYK printing inks. Then, color gamut mapping is incorporated in the assignment of the Lab color values to the CMYK color values of the printing process color profile, compressing the colors to the printable color gamut. In such a case, in particular, the unprintable light and saturated colors are converted into similar colors in the marginal area of the color gamut of the printable colors so that the result is an overall harmonious color impression without subjectively perceived color distortions. These restrictions can be reduced if, instead of the standard printing inks for CMY and K, special CMYK printing inks that have a higher chroma or blackness are used. Another solution is printing with further colored printing inks in addition to the CMYK printing inks, for example, with three further printing inks R, G, and B, which widen the printable color gamut in the region of the red, green, and blue hues.

The associations given in the color profiles between device dependent color spaces and a device independent color space (e.g., Lab) are also used, according to the prior art, for the color space transformation during the production of a proof. For the correct color reproduction of the proof, a color space transformation is needed because the printing processes and devices used have different color characteristics. The edition printing is, for example, carried out on an offset press, the proof printing, for example, with an electrophotographic printing process based on color toners that are fused into the paper, or with an inkjet printing process. Using the associations given in the color profiles between a device dependent color space and a device independent color space in each case, the color values [C, M, Y, K] of the edition printing process are transformed into the color values [CP, MP, YP, KP] of the proof printing process such that the proof has the same colors, according to the visual impression, as the edition print.

Figure 1:
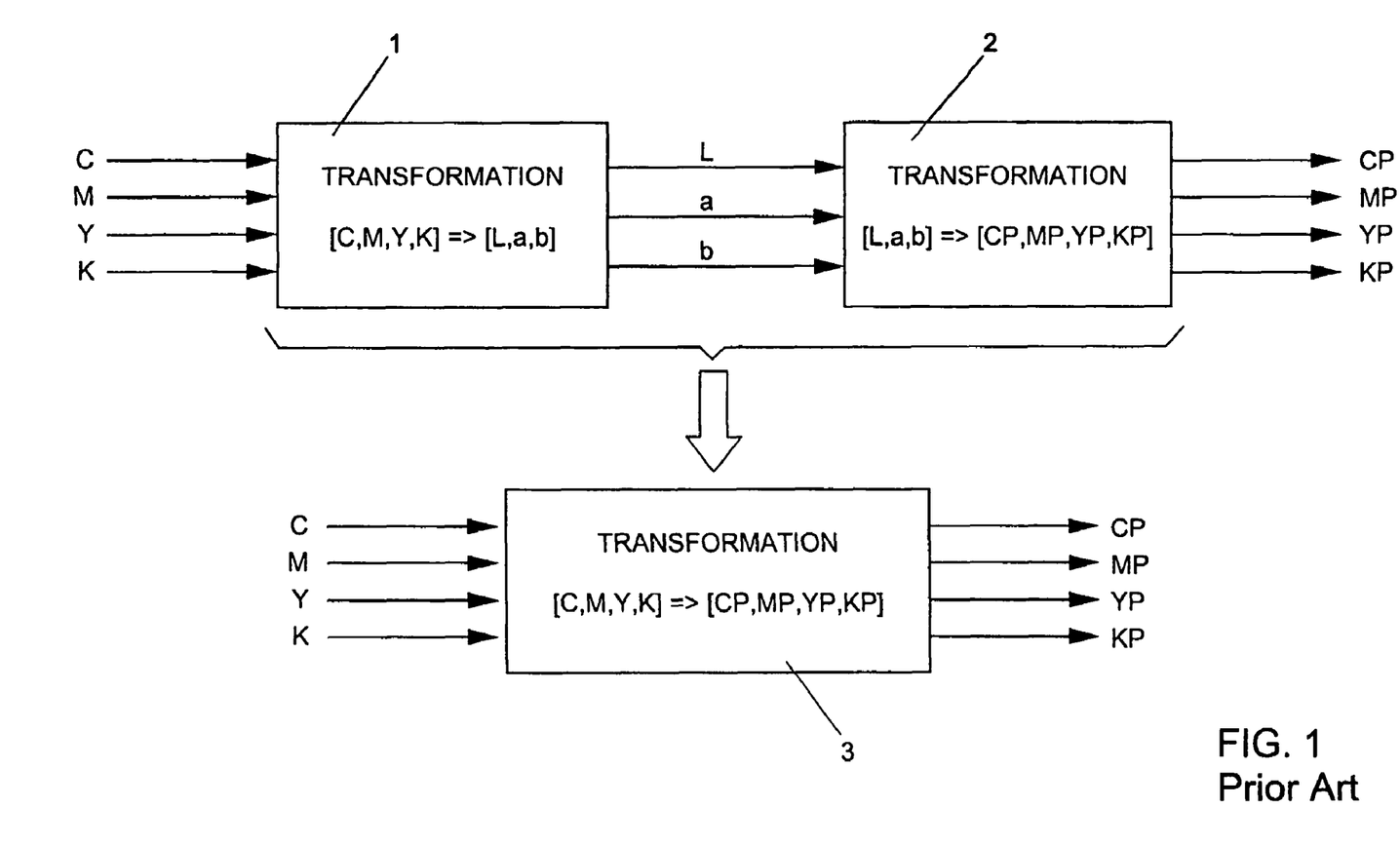
FIG. 1 is a block diagram of a prior art color space transformation of a four-color printing process into a proof printing process.

FIG. 1 shows a simple color space transformation for such a printing process adaptation according to the prior art in a block diagram. A first color space transformation 1 from the color values [C, M, Y, K] of the edition printing process into Lab color values, and a second color space transformation 2 from the Lab color values into the color values [CP, MP, YP, KP] of the proof printing process are carried out one after the other. The two color space transformations 1 and 2 can also be combined to form an equivalent third color space transformation 3, which assigns the color values [C, M, Y, K] and the color values [CP, MP, YP, KP] directly to one another. Because, in each case the color values [C, M, Y, K] and [CP, MP, YP, KP] that result in the same Lab color values are associated with one another through the device independent Lab intermediate color space, the associated printing inks in the two printing processes are perceived as visually identical within the color gamut.

Figure 2:
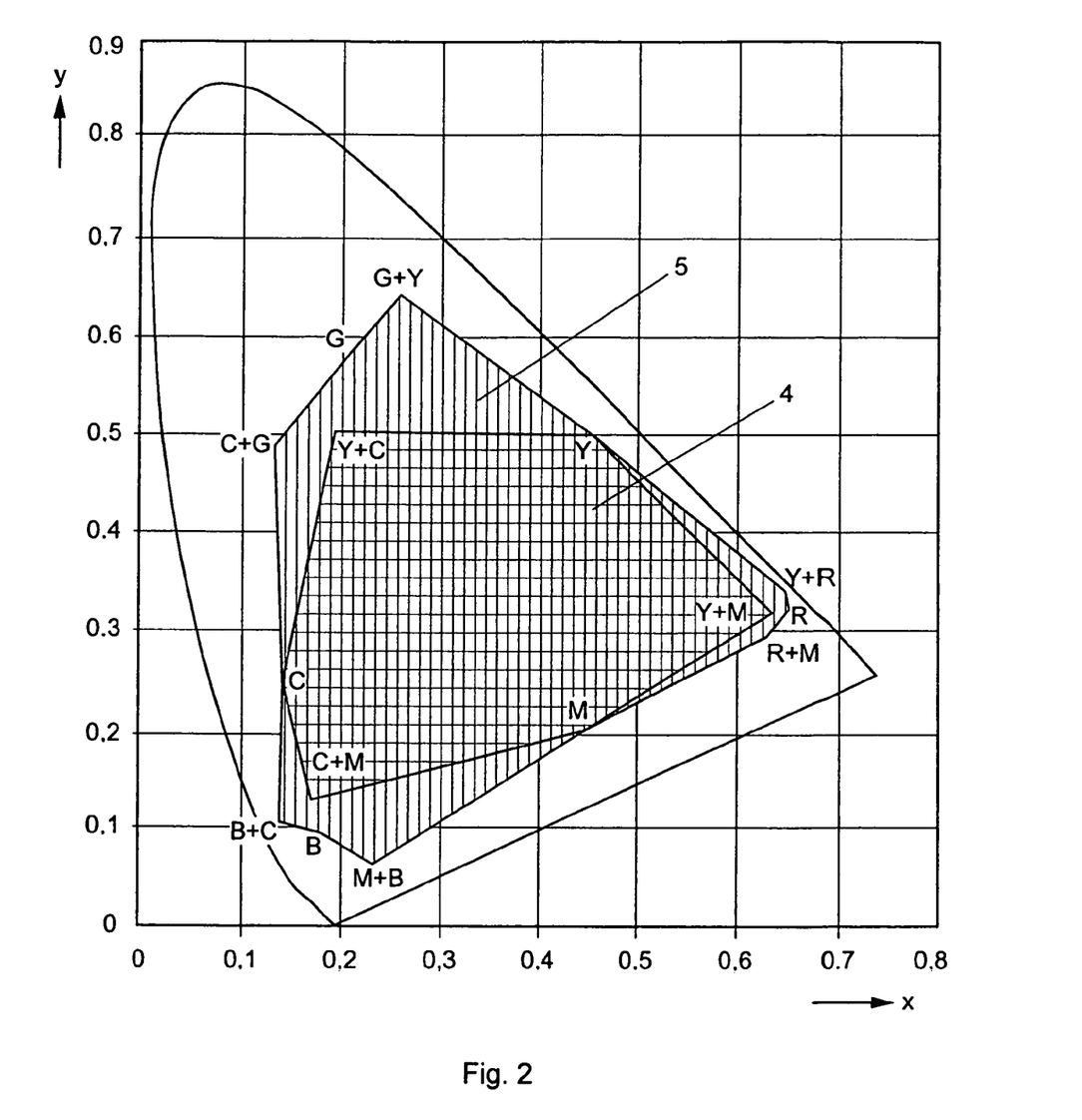
FIG. 2 is a graph of a color gamut of a four-color printing process and of a seven-color printing process.

Because of the restriction of the color gamut of the CMYK printing inks, more than four printing inks are also used frequently in a printing process, the printable color gamut being widened in specific hue regions with further colored printing inks. In the following text, for the purpose of clear distinction, the CMYK printing inks will be designated "primary printing inks" and the further colored printing inks "secondary printing inks." Using such a printing process, which uses the secondary printing inks red, green, blue (R, G, B), whose pigments are distinctly more colored than the corresponding mixed colors of the primary printing inks, in addition to the primary printing inks C, M, Y, and K, it is possible for the colors of an original image, for example, a slide, to be reproduced more brilliantly and with fewer restrictions. In addition, better reproduction of spot colors (decorative colors) and, at the same time, improved process stability can be achieved in the print. FIG. 2 shows, in an xy color locus diagram, the color gamut 4 of the primary printing inks and the expanded color gamut 5 of the seven-color printing process including the primary printing inks and the secondary printing inks, for comparison. Instead of the three secondary printing inks, only one or two can also be used, that is to say, it is possible to print with a total of five or six printing inks, if the printable color gamut is to be expanded only in one or two hue regions.

Figure 3:
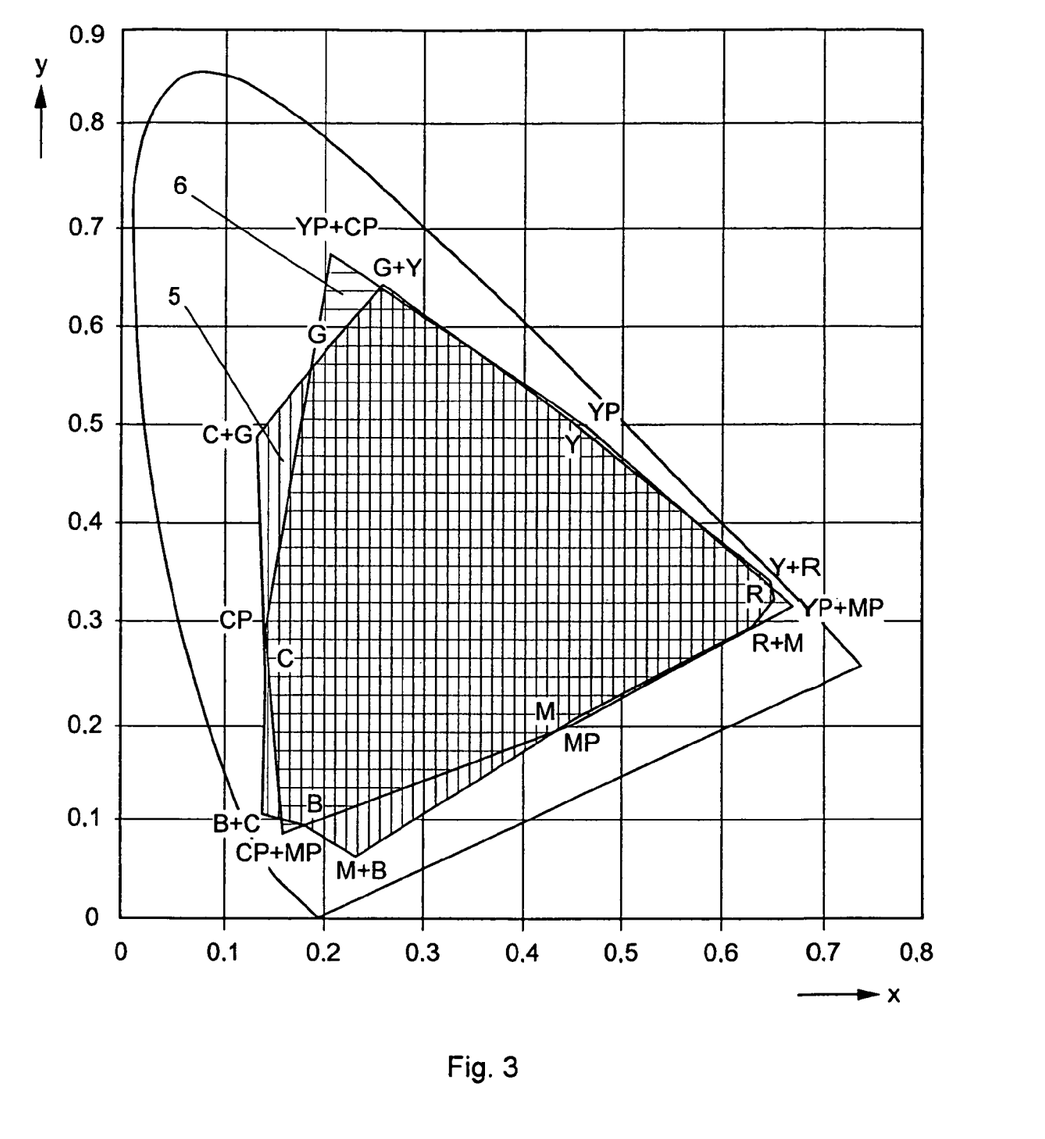
FIG. 3 is a graph of a color gamut of a proof printing process and of a seven-color printing process.

To produce a proof for an edition printing process that uses more than four printing inks, it is also possible to print with the same number of proof printing inks in the proof printing process, in particular with specific colored proof printing inks that correspond exactly to the secondary printing inks of the edition print in the red, green, and blue hue regions. However, such a solution is complicated and very expensive. In addition, it cannot be employed sufficiently flexibly because a proof printing system must be mapped to a quite specific set of edition printing inks. Therefore, proof printing systems generally operate with four proof printing inks cyan-P (CP), magenta-P (MP), yellow-P (YP) and black-P (KP), which do not correspond to the primary printing inks C, M, Y, and K but have a greater printable color gamut. FIG. 3 shows in an xy color locus diagram the color gamut 6 of the proof printing inks CP, MP, YP, KP and the color gamut 5 of the seven-color printing process of the edition print, for comparison. It becomes clear that the color gamut 6 of the proof printing inks is considerably greater than the color gamut 4 of standard primary printing inks C, M, Y, K (FIG. 2) and almost completely covers the expanded color gamut 5 of the seven-color print.

Figure 4:
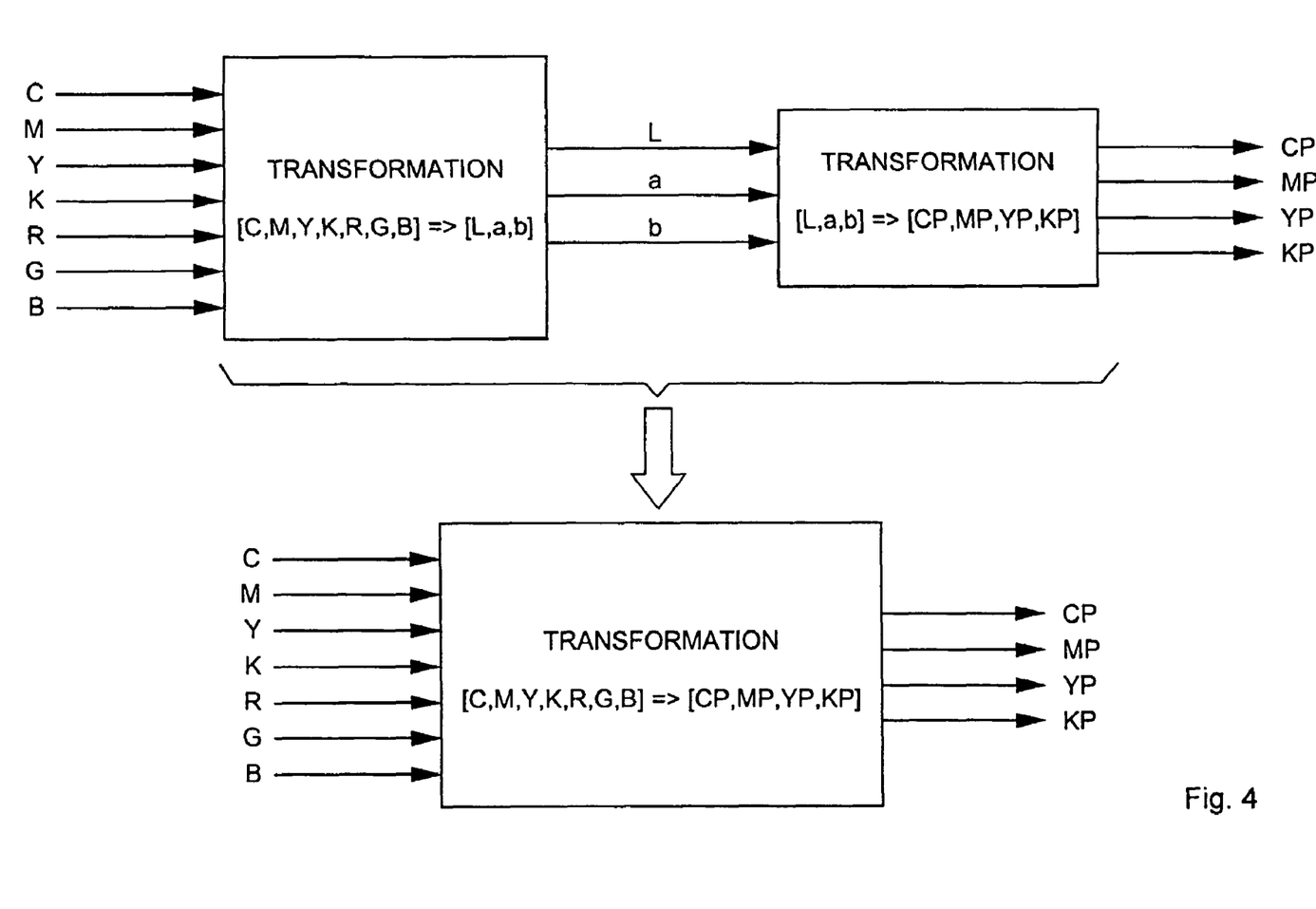
FIG. 4 is a block diagram of a color space transformation of a seven-color printing process into a proof printing process.

FIG. 4 shows in a block diagram the linking of two color space transformations with which the color values [C, M, Y, K, R, G, B] of the edition print are converted firstly into device independent Lab color values and, then, further into the equivalent color values [CP, MP, YP, KP] of the proof. As already described, the association tables of the color profiles do not contain the associated output color values for all the value combinations of the input color values that are possible at all but only for a coarser, regular grid of reference points. For value combinations that lie between the grid points, the output color values to be assigned are interpolated from the stored output color values of the adjacent reference points. To ensure sufficient accuracy of the color space transformations, at least 16 reference points are needed for each color component. For the conventional four-color printing, the four-dimensional table that assigns the Lab output color values to the CMYK input color values, therefore, contains $16^4$=65,536 reference points. Because, for each reference point, three output color values each having 2 bytes are stored, the table has a size of 393,216 bytes.

However, for seven-color printing, the corresponding seven-dimensional table that describes the first color space transformation in FIG. 4 would have to contain $16^7$=268,435,456 reference points. It would, then, have a storage size of 1,610,612,736 bytes. It is usual for 33 reference points to be used for each color component for the association table of the second color space transformation in FIG. 4. Because the table in each case assigns four output color values to the Lab input color values, it has $33^3$=35,937 reference points and a size of 287,496 bytes. The two color space transformations, from [C, M, Y, K, R, G, B] to [Lab] and from [Lab] to [CP, MP, YP, KP] can also, again, be combined to form a color space transformation that transforms the color values of the seven-color print into the color values of the proof in one step. The combined color space transformation is, then, also described by a seven-dimensional association table, in which in each case four output color values are entered for each reference point.

The extreme size of the seven-dimensional association tables represents a great problem in the implementation of the color space transformations that are needed for the production of the proof for the seven-color edition print. Such large tables take up a large part of the storage space available in a computer. Added to this is the fact that, as a rule, three such association tables are contained in an ICC color profile, which are directed at different rendering intents. In addition, the computing operations are slowed to an extreme extent by excessively large tables because, because of their size, they no longer fit completely into the computer RAM and, for the most part, have to be exported to a disk memory. Then, during the execution of the color space transformation, when reference points from the table are needed and are currently not located in RAM, they, first, must be loaded from the disk memory into the RAM. To bring the seven-dimensional table to a sensible order of magnitude, it would be necessary for the number of reference points of each color component to be reduced very sharply, for example, to 5 reference points ($5^7$=78,125). Given such a small number of reference points, however, the quality of the color space transformation is so poor that it is not suitable in this form for the production of an obligatory color proof.

SUMMARY OF THE INVENTION

It is accordingly an object of the invention to provide a method for producing a proof for a printing process having more than four printing inks that overcomes the hereinafore-mentioned disadvantages of the heretofore-known devices and methods of this general type and that solves the problem of excessively large association tables in the color profiles and provides specifies a method with which the proof can be reproduced with a sufficiently high quality for the requirements on the color obligation.

According to the invention, the color profile tables having more than four dimensions are divided up into a plurality of four-dimensional color profile tables that each have a sufficiently high number of reference points and, thus, permit accurate color reproduction as a result of the color space transformation. The method is distinguished by the fact that the known methods of creating and applying ICC color profiles have to be changed only slightly so that, to a large extent, the same program structures can be used as are already available for the creation and application of ICC color profiles.

With the foregoing and other objects in view, there is provided, in accordance with the invention, a method for producing a proof, utilizing a combination of the primary printing inks cyan, magenta, yellow, black and at least one secondary printing ink red, green, blue for an edition printing process and utilizing proof printing inks cyan-P, magenta-P, yellow-P, black-P for a proof printing process, includes the steps of converting the printing inks of the edition printing process with association tables into the printing inks of the proof printing process, storing associated output color components in the association tables for combinations of input color components, and dividing association tables having more than four input color components into a plurality of association tables having a maximum of four input color components.

With the objects of the invention in view, there is also provided a method for producing a proof, including the steps of converting, with association tables, a combination of the primary printing inks cyan, magenta, yellow, black and at least one secondary printing ink red, green, blue of an edition printing process into proof printing inks cyan-P, magenta-P, yellow-P, black-P of a proof printing process by storing associated output color components in the association tables for combinations of input color components and dividing association tables having more than four input color components into a plurality of association tables having a maximum of four input color components.

In accordance with another mode of the invention, there is provided the step of printing, at no point on a printing material, more than four printing inks in the edition printing process.

In accordance with a further mode of the invention, there is provided the step of printing at any point on a printing material no more than four printing inks in the edition printing process.

In accordance with an added mode of the invention, there is provided the step of utilizing gray component replacement to replace proportions of the primary printing inks cyan, magenta, yellow with the primary printing ink black in the color separation for the edition printing process.

In accordance with an additional mode of the invention, there is provided the step of utilizing color component replacement to replace proportions of the primary printing inks cyan, magenta, yellow with one of the secondary printing inks red, green, blue in the color separation for the edition printing process.

In accordance with yet another mode of the invention, there is provided the step of selecting a factor of the gray component replacement as a function of a chroma of a color to be printed.

In accordance with yet a further mode of the invention, there is provided the step of selecting a factor of the color component replacement as a function of a chroma of a color to be printed.

In accordance with yet an added mode of the invention, there is provided the step of selecting a factor of the gray component replacement and a factor of the color component replacement as a function of a chroma of a color to be printed.

In accordance with yet an additional mode of the invention, there is provided the step of applying a color component replacement only to a color to be printed to which a gray component replacement with a factor of 100% has already been applied.

In accordance with again another mode of the invention, there is provided the step of first converting the printing inks of the edition printing process into a device independent color space and subsequently into the printing inks of the proof printing process.

In accordance with again a further mode of the invention, there is provided the step of storing the association tables in an ICC color profile.

In accordance with a concomitant mode of the invention, there is provided the step of converting the printing inks of the edition printing process directly into the printing inks of the proof printing process in one step.

Other features that are considered as characteristic for the invention are set forth in the appended claims.

Although the invention is illustrated and described herein as embodied in a method for producing a proof for a printing process having more than four printing inks, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The method according to the invention will be explained by using the example of a printing process that, in addition to the primary printing inks CMYK, also uses the secondary printing inks red, green, blue (RGB). The pigments of the secondary printing inks, preferably, have a considerably higher chroma than the corresponding mixed colors of the primary printing inks. For example, the full-tone density (100% tonal value) of the secondary printing ink red is more colored than the overprint of the full-tone densities of the primary printing inks yellow and magenta. The chroma is defined as the radius in the ab plane of the Lab color system:

$$c=\sqrt{a^2+b^2} \qquad (1)$$

The hue is defined as the angle in the ab plane of the Lab color system:

$$h = \arctan\left(\frac{b}{a}\right) \qquad (2)$$

Figure 5:
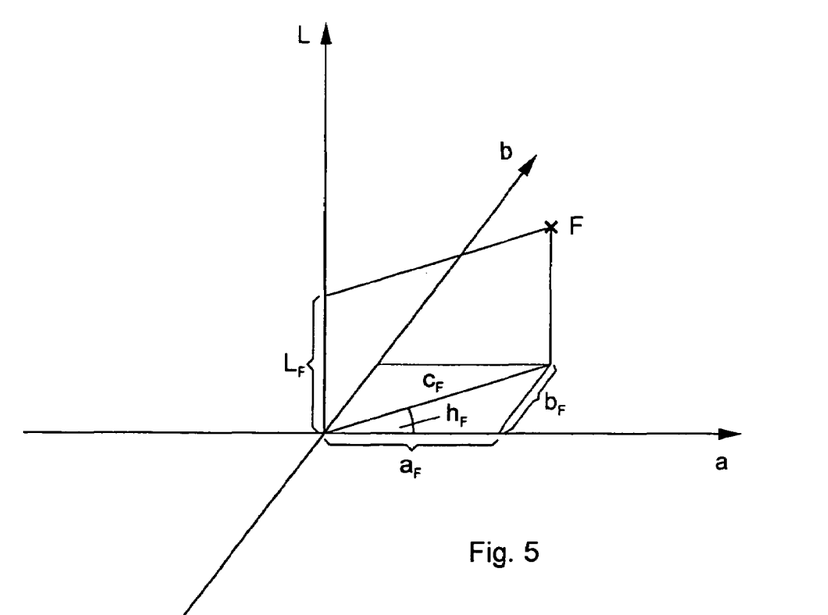
FIG. 5 is a three-dimensional graph of the Lab color system.

Referring now to the figures of the drawings in detail and first, particularly to FIG. 5 thereof, there is shown the parameters chroma $c_F$ and hue $h_F$ for a color F having the components $L_F$, $a_F$, $b_F$ in the lab color system. The Lab color components form a three-dimensional color space having a lightness axis (L) and two chroma axes (a, b), which can be imagined in the plane of a color circle through whose center the lightness axis runs.

Figure 6:
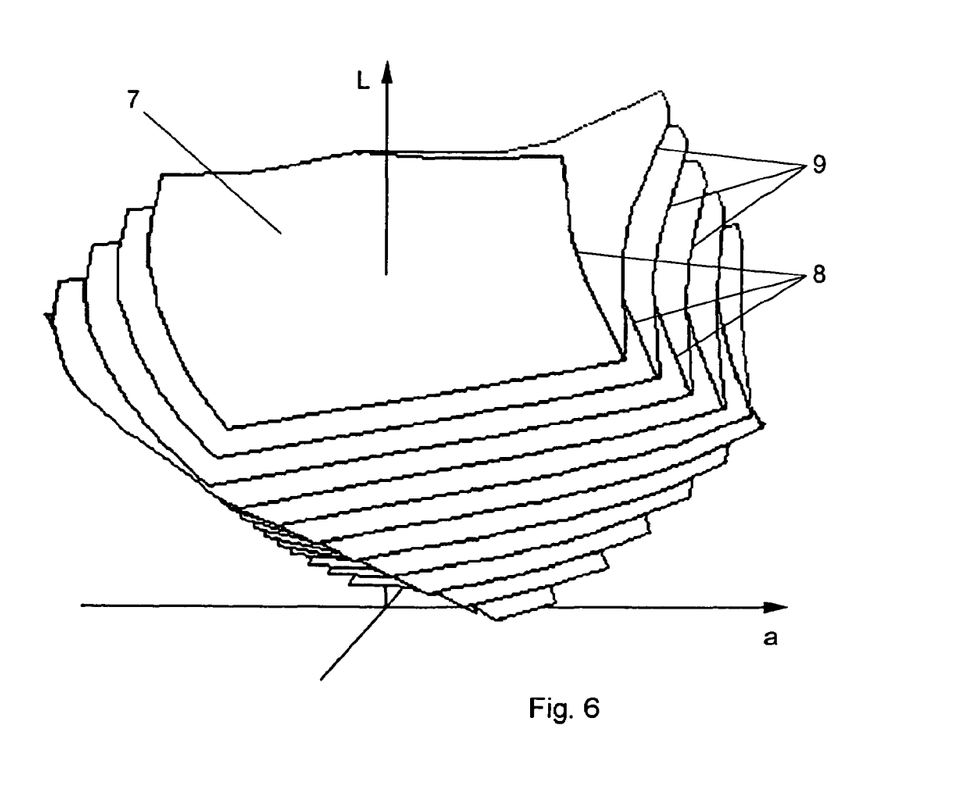
FIG. 6 is a three-dimensional graph of a color body in the Lab color system.

As a result of the higher chroma of the secondary printing ink red, a greater printed color gamut is achieved in the region of the red hues than would be possible with the primary printing inks on their own. FIG. 6 illustrates that in a perspective view of a color body 7 in the Lab color system, which shows the printable color gamut in various lightness planes when, in addition to the primary printing inks CMYK, printing is also carried out with the secondary printing ink red. To improve the clarity, only some of the lightness planes are shown. The boundary lines 8 describe the color gamut that can be printed with the primary printing inks CMYK. The boundary lines 9 in the region of the red hues describe the expanded color gamut that results with the secondary printing ink red. It also becomes clear that the color body 7 has a complex form because the position and extent of the boundary lines 8 and 9, which identify the color gamut with respect to the ab plane, depend highly on the lightness value L.

Figure 7:
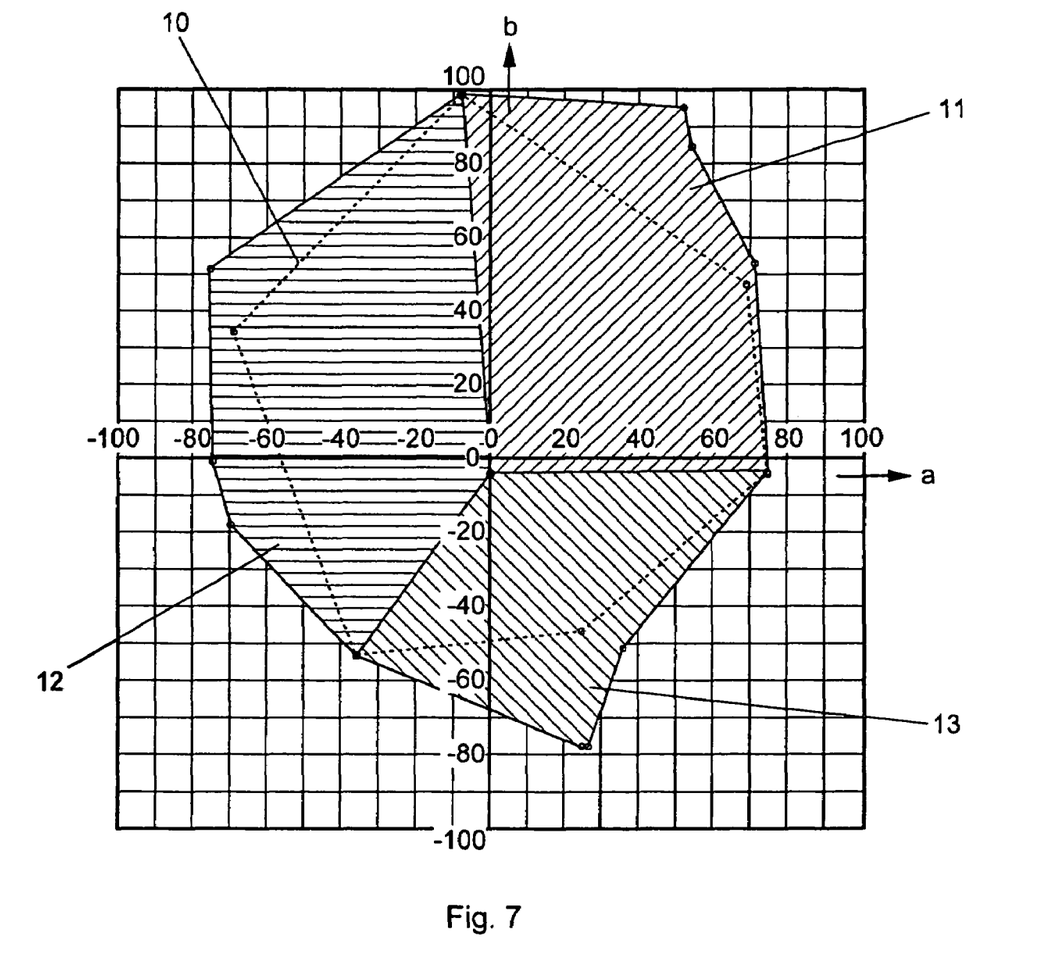
FIG. 7 is a graph of color gamuts of various printing ink combinations according to the invention.

Using the secondary printing inks green and blue, the color gamut can be expanded in a corresponding way in the regions of the green and blue hues. FIG. 7 shows, in a projection onto the ab plane of the Lab color system, the printable color gamut 10 of the primary printing inks CMYK, the sector 11 of the colors that can be printed with the printing ink combination RMYK, the sector 12 of the colors that can be printed with the printing ink combination CGYK and the sector 13 of the colors that can be printed with the printing ink combination CMBK. The sectors 11, 12, and 13 each describe the printable color gamut that can be achieved with the corresponding secondary printing ink and three primary printing inks. The printable color gamuts vary in shape and size as a function of the lightness value L (FIG. 6), which is not shown in FIG. 7 to simplify the illustration. In the region of the colors with low and medium chroma, the color gamuts of the sectors 11, 12, and 13 overlap with the color gamut of the primary printing inks CMYK, that is to say, a red hue in the overlap region could be printed both with the primary printing inks CMYK and with the printing ink combination RMYK. One of the secondary printing inks has to be used only for the colors with high chroma.

The method according to the invention makes use of the fact that, even in a seven-color print, it is usually the case that no more than 4 colors have to be overprinted at one point on the printed sheet. Firstly, it is necessary to comply with the maximum area coverage, that is to say, the sum of the tonal values of the overprinted printing inks must not exceed a maximum value that, in the case of offset printing, depends on the paper grade used. The maximum area coverage is, for example, 340% for coated offset papers and 280% for uncoated papers. Secondly, too many printing inks at the same point lead to graying and, therefore, to an impaired printed image. However, it is significant that it is not necessary either to overprint more than 4 colors to achieve high-quality color reproduction. As a precondition to the application of the method according to the invention for the color space transformation for the production of the proof, as early as during the creation of the color separation tables for the seven-color printing, it is ensured that at no point on the printed sheet are more than four printing inks overprinted.

Figure 8:
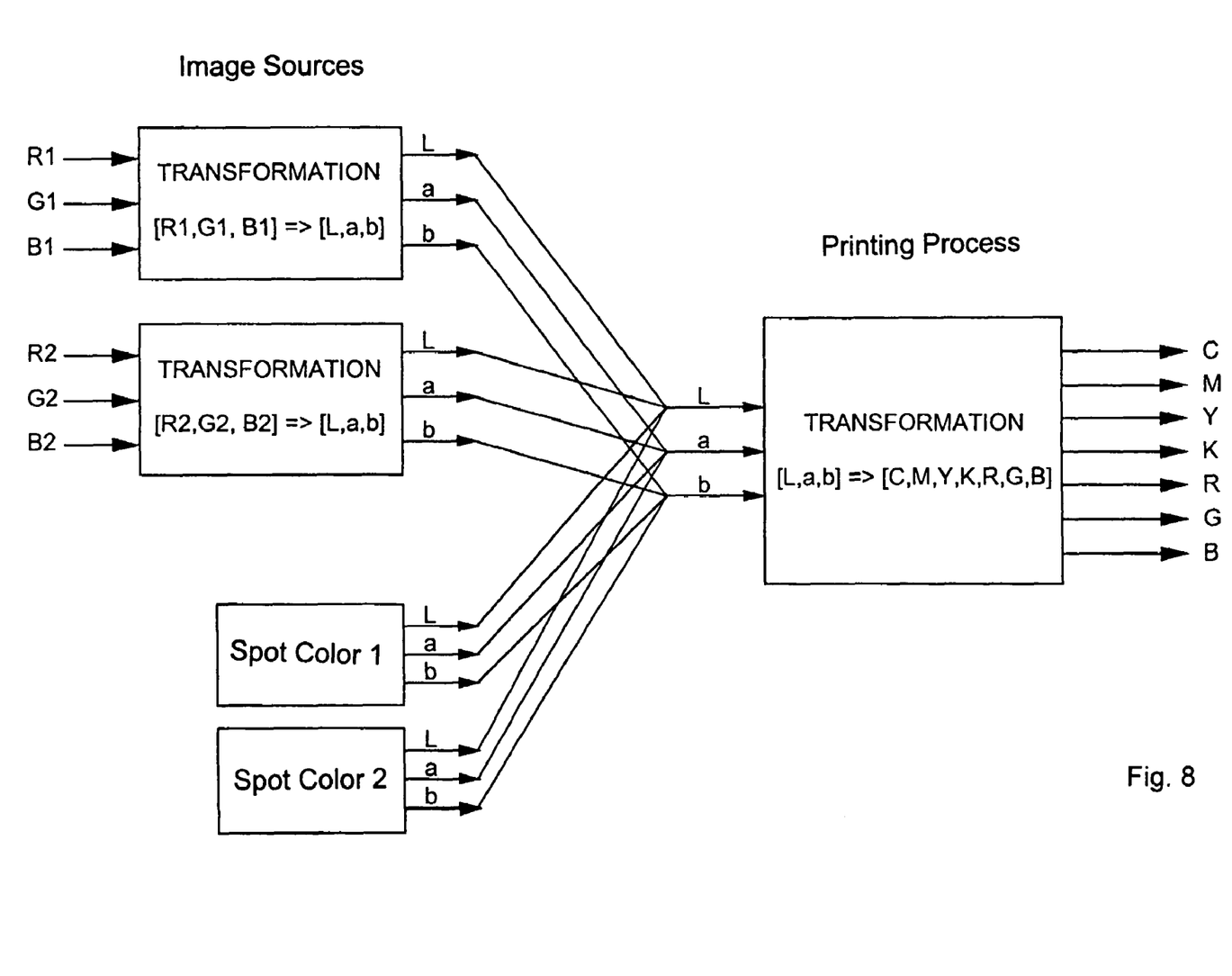
FIG. 8 is a block diagram of the color separation of a seven-color printing process according to the invention.

FIG. 8 illustrates the color separation that exists for each image source from the sequential application of two color space transformations in each case by the corresponding color profiles. The content of a printed sheet comes from various image sources that each have their own characteristic color characteristics. For example, a scanner supplies image data in a color space having the components R1, G1, B1 and a digital camera supplies image data in another color space R2, G2, B2. In addition, spot colors are also printed, whose colors are defined directly by the statement of their Lab color values. Special colors, also called decorative colors (spot colors), are used in reproduction and printing technology to reproduce product-specific colors or company-specific colors in printed products. Examples of spot colors are the specific blue on the products bearing the trademark NIVEA® or the blue from the image mark "HEIDELBERG" in the company logo of Heidelberger Druckmaschinen AG. Based upon respectively individual color profiles, the device specific color values of the image sources are converted into Lab color values. The appropriate color values of the seven printing inks are, then, assigned to the Lab color values with the actual separation table that is contained in the output color profile of the printing process. This separation table contains seven color values for each Lab reference point, a maximum of four of these color values having a value different from zero. This is achieved by the application of methods such as gray component replacement (GCR) and color component replacement (CCR) when creating the separation table.

It can be seen from FIG. 7 that colors that lie in the inner region of the color gamut 10 of the primary printing inks CMYK can be reproduced sufficiently accurately both with the primary printing inks on their own and with a combination of a secondary printing ink and three primary printing inks. Here, it is necessary to decide whether or not the use of a secondary printing ink makes sense for such colors. One preferred strategy is to print colors with a chroma up to a predefined threshold value only with the primary printing inks, that is to say, such colors are printed with only a maximum of four of the seven printing inks available. Only for colors whose chroma lies above the threshold value is one of the secondary printing inks used. This strategy is practical because the secondary printing inks have the task of specifically reproducing the colors with high chroma more brilliantly and more clearly in the hue regions including red, green, or blue than is possible by overprinting the primary printing inks.

Figure 9A:
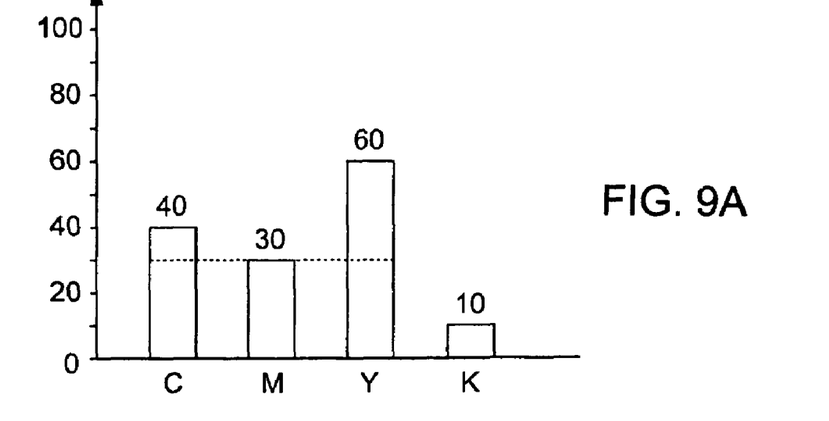
FIGS. 9A to 9C are graphs illustrating examples of gray component replacement (GCR)
Figure 9B:
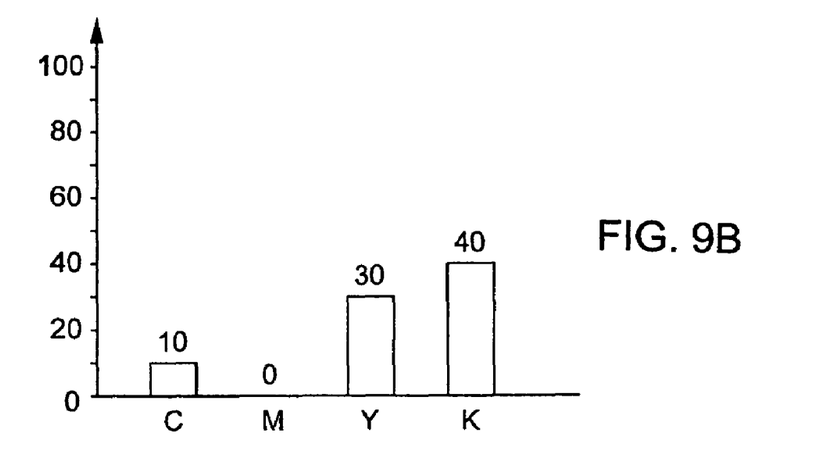
Figure 9C:
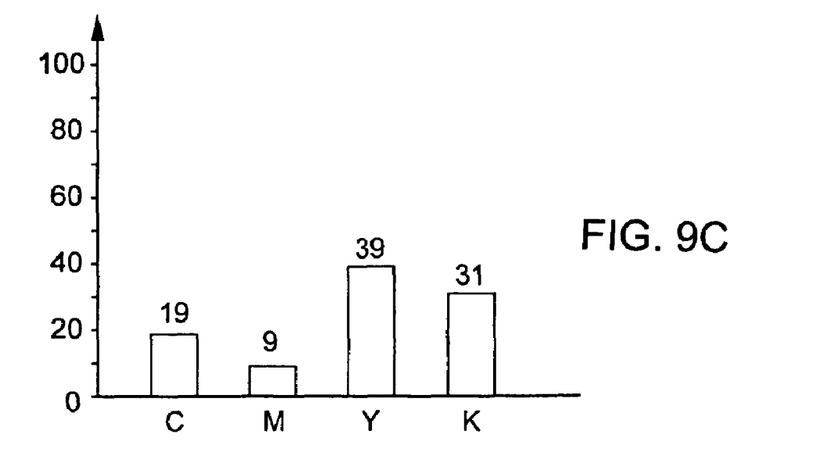

From reproduction technology, it is known that the primary printing ink system is over-determined, that is to say, a color with given Lab color values can be produced with various combinations of the proportions of CMYK. For example, gray colors and dark colors can be printed with a higher proportion of the primary printing ink K and correspondingly lower proportions of the primary printing inks CMY or, else, with a lower proportion of K and correspondingly higher proportions of CMY. This decision determines what is known as the black buildup of the colors and, for example, is made by the GCR method. This will be explained by using a simple example, which is illustrated in FIGS. 9A to 9C. In the GCR method, the graying proportions of the colored printing inks CMY are replaced by the black printing ink. In the case of a combination of 40% C, 30% M, 60% Y, and 10% K, the graying proportion is the minimum of the values of the colored printing inks, that is to say, 30% here (FIG. 9A). This amount is subtracted from the colored printing inks and added to the black separation. For a complete GCR (GCR factor of 100%), the new color proportions 10% C, 0% M, 30% Y, and 40% K are, therefore, obtained (FIG. 9B). Given a GCR factor of 100%, in theory, only 3 colors are printed at each point on the printed sheet (in the four-color print). In practice, for printing reasons, operations are carried out with lower GCR factors of, for example, 70%. In the above example, this means that only 70% of the maximum possible 30% of the joint proportion of the colored printing inks, that is to say, 21%, is subtracted from the colored printing links and added to the black separation. The result is, therefore, the values 19% C, 9% M, 39% Y, and 31% K (FIG. 9C). This example is a great simplification illustrating the principle of the calculations of color separations, which are very complex in detail. In the case of calorimetrically correct application of the GCR, other values result on account of the nonlinear relationships and cannot be obtained merely by simple subtractions and additions either.

Figure 10A:
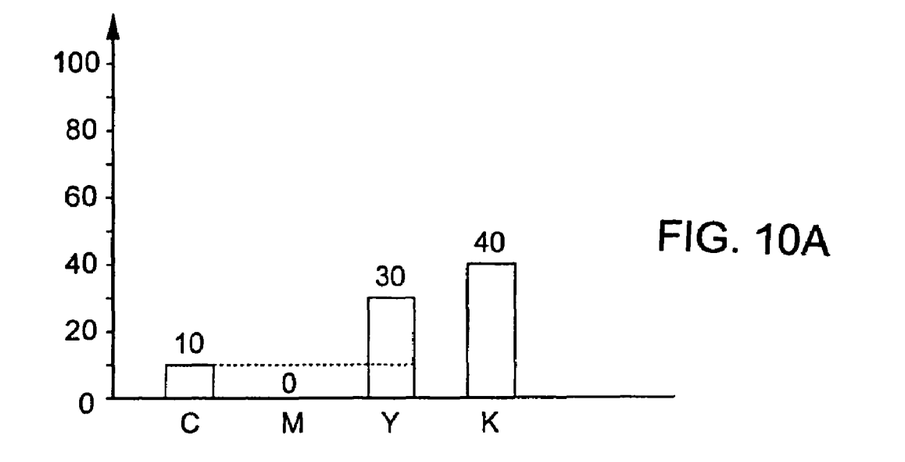
FIGS. 10A to 10C are graphs illustrating examples of color component replacement (CCR)
Figure 10B:
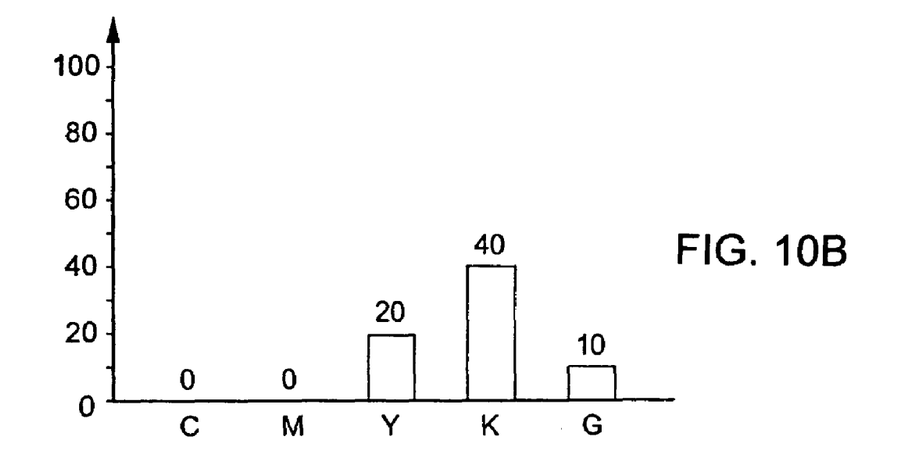
Figure 10C:
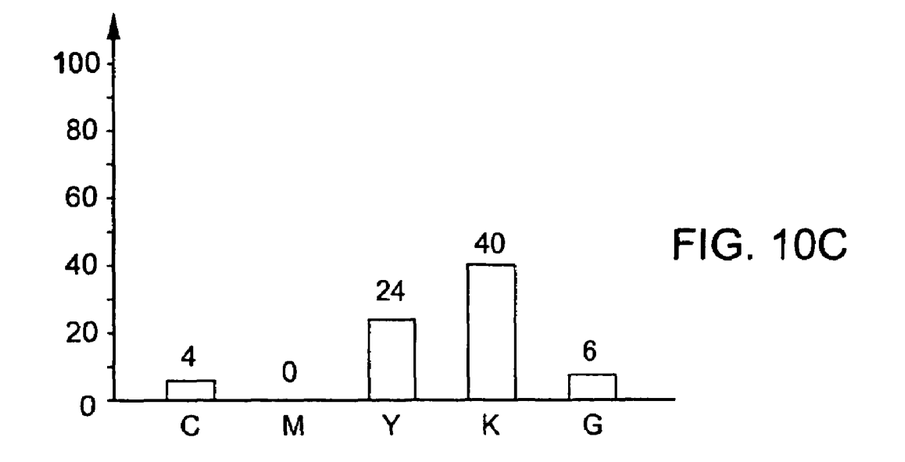

The use of the secondary printing inks R, G, or B leads to replacement of mixed colors from the colored primary printing inks. For instance, overprinting the primary printing inks cyan and yellow results in a green mixed color so that these primary printing inks can partly be replaced by the secondary printing ink green. The replacement can be made in accordance with the color component replacement (CCR) method. FIG. 10 illustrates a simple example in this respect. To not print more than 4 colors at a location when one of the secondary printing inks is used, the primary printing ink that is complementary to the secondary printing ink must be removed. This is achieved by a GCR with the factor 100% of the primary printing inks C, M, Y, K. This is also expedient because the complementary printing ink would only lead to graying or darkening, which can be achieved better with the primary printing ink black. In the example, a GCR with the factor 100% of a color having the proportions 40% C, 30% M, 60% Y, and 10% K is assumed, that is to say, the output color for the CCR has the proportions 10% C, 0% M, 30% Y, and 40% K (FIG. 9B, FIG. 10A). The joint proportion of cyan and yellow is 10% here. In the case of a CCR with the factor 100%, this amount is subtracted from the two primary printing inks and added into the secondary printing ink green. This results in the proportions 0% C, 0% M, 20% Y, 40% K, and 10% G (FIG. 10B). In the case of a CCR with the factor 100%, theoretically, only 3 colors will, likewise, be printed at each point on the printed sheet, one of the colored primary printing inks, black, and one of the secondary printing inks. In practice, operations are carried out with lower CCR factors and the CCR factor is increased the greater the chroma of a color to be printed. In the case of a CCR factor of 60%, the result for the example is that only 60% of the maximum possible 10% of the joint proportion of the printing inks cyan and yellow, that is to say, 6%, is subtracted from these printing inks and added to the green separation. The proportions 4% C, 0% M, 24% Y, 40% K, and 6% G, therefore, result (FIG. 10C).

Figure 11:
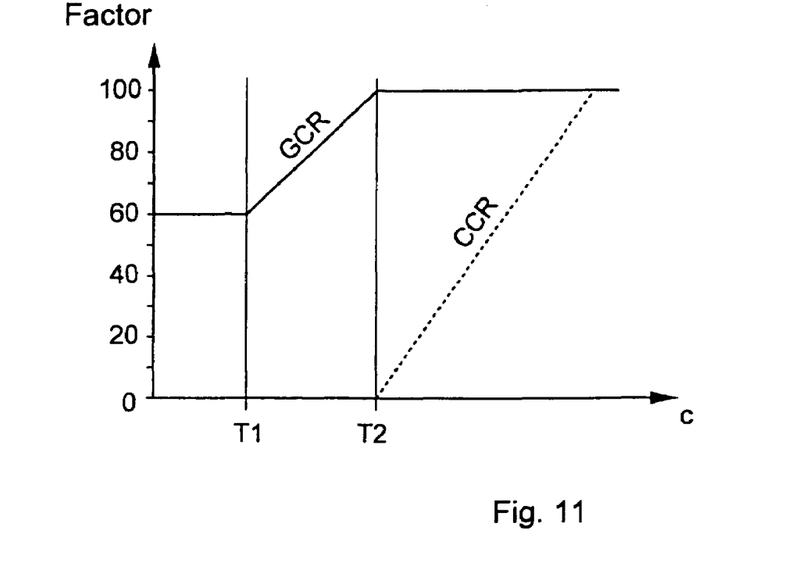
FIG. 11 is a graph of a course of a GCR factor and of a CCR factor.

As already described, the color separation is carried out such that colors that lie in the inner region of the color gamut 10 of the primary printing inks CMYK are printed only with the primary printing inks. If the colors are located in the vicinity of the gray axis, that is to say, have a low chroma up to a first threshold value T1, they are subjected to a moderate GCR, for example, with a GCR factor of 60%. In this region, an excessively high GCR factor would lead to printing problems, for example, the gloss of the printed color would be impaired if the black proportion were too high. For colors whose chroma lies above the threshold value T1, the GCR factor is increased continuously until it reaches the factor 100% at a second threshold value T2. FIG. 11 shows the course of the GCR factor as a function of the chroma c. As far as the threshold value T2, the printed colors, therefore, contain only proportions of all the four primary printing inks CMYK. Above the threshold value T2, at a GCR factor of 100%, one of the colored primary printing inks C, M, or Y is no longer contained in the printed color. Only for those colors whose chroma lies above the threshold value T2 does one of the secondary printing inks R, G, or B come into use, that is to say, a secondary printing ink is added to the three primary printing inks of which these colors are composed. The printed colors in this chroma range have one of the possible compositions RMYK, CGYK, or CMBK, that is to say, likewise are only of four printing inks. In this region, the CCR factor is, then, raised continuously until it reaches the factor 100% at colors with a very high chroma. By the transition regions, in which the GCR factor and the CCR factor are raised continuously, abrupt changes in the composition of similar colors are avoided, so that, in particular, what are referred to as breaks in color progressions do not occur.

Figure 12:
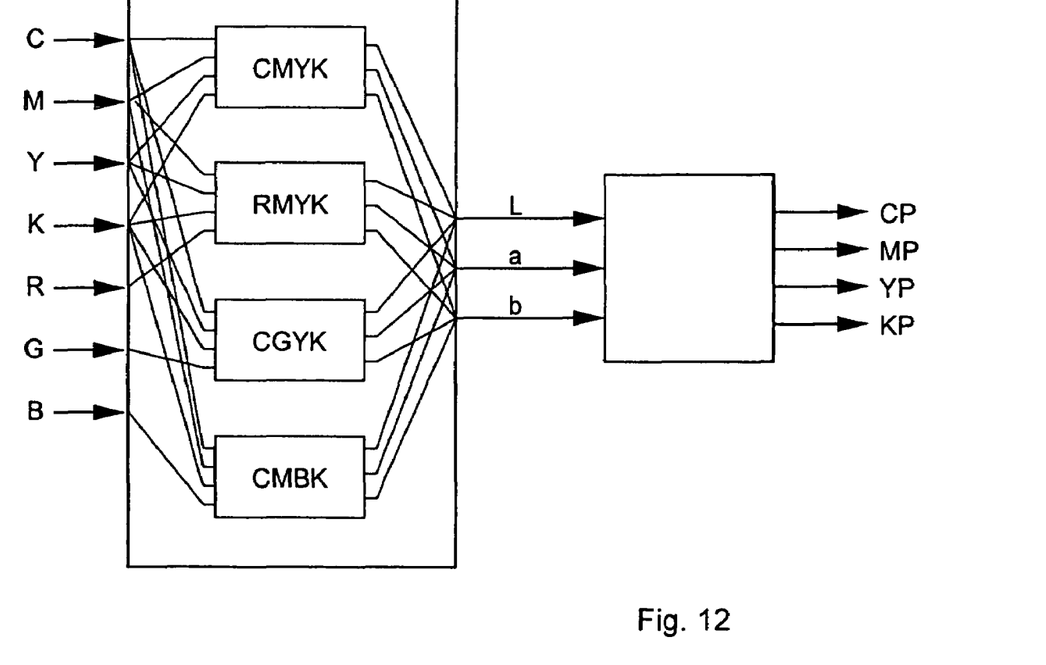
FIG. 12 is a block diagram of a color space transformation of a seven-color printing process into a proof printing process according to the invention according to the invention.

By the color separation with a GCR and CCR course according to FIG. 11, no more than four printing inks are overprinted at any point on the printed sheet, either the four primary printing inks CMYK in the region of low chroma or one of the printing ink combinations RMYK, CGYK, or CMBK in the region of higher chroma. The method according to the invention makes use of this fact to divide the excessively large seven-dimensional association table of the color profile needed for the proof, which assigns Lab color values in each case to the seven printing ink components (FIG. 4), into four four-dimensional association tables, which each have a sufficiently high number of reference points and, thus, permit accurate color reproduction in the proof. The color space transformation so modified for the proof is shown in FIG. 12. The seven printing ink components CMYKRGB are converted into device independent Lab color values with a first color profile. The first color profile contains four association tables, which each assign the output values Lab to a combination of four input color components, the combinations CMYK, RMYK, CGYK and CMBK. Using the above-described color separation of the seven-color print, each printed color can also be composed only of one of these four combinations of printing inks. During the application of the first color profile, a check is made to see which of the four combinations a printed color exist, that is to say, what proportions of the seven printing inks are different from zero, and, then, the associated Lab color values are interpolated from the reference values in the associated association table. The association tables of the four printing ink combinations have 16 reference points for each color component, that is to say $16^4$=65,536 reference points. With three output color values of 2 bytes each, which are stored for each reference point, each table has a size of 393,216 bytes. Together, the four tables, therefore, have a memory requirement of 1,572,864 bytes.

As compared with the 1,610,612,736 bytes needed for the seven-dimensional association table, this is a reduction in the memory requirement by the factor 1024.

If an ICC color profile is used for the first color profile, the four association tables, which in each case assign the output values Lab to the combinations CMYK, RMYK, CGYK, and CMBK, can be incorporated in the profile as what are referred to as private entries. Transformation software, with which the proportions of the printing inks for the proof are calculated, detects the private entries and switches between the four association tables as a function of the composition of a printed color during the conversion into the Lab color values.

Figure 13:
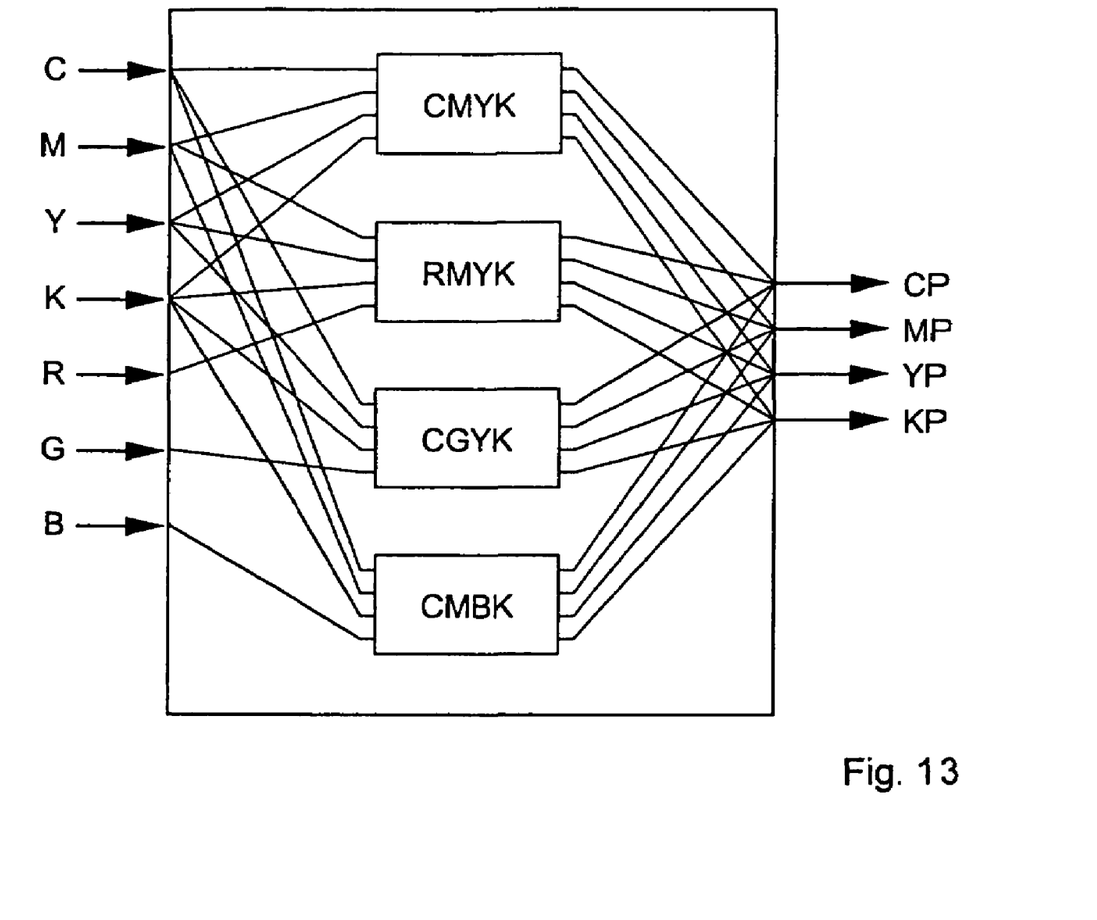
FIG. 13 is a block diagram of an alternative embodiment of the color space transformation of a seven-color printing process into a proof printing process according to the invention.

Following the conversion of the seven printing inks into the Lab color values by the four association tables of the first color profile, the Lab color values are converted by a second color profile into the color components CP, MP, YP, and KP of the proof (FIG. 12). In an alternative embodiment, the first color profile changed in accordance with the method of the invention and the second color profile can also be combined to form a color space transformation that carries out the transformation in one step. This is illustrated in FIG. 13. From the concatenation of each table of the first color profile and the table of the second color profile (FIG. 12), in each case, a new association table is calculated that assigns the four components CP, MP, YP, KP of the proof directly to the four printing ink components CMYK or RMYK or CGYK or CMBK. By referring to one of these tables, depending on which proportions of the seven printing inks are different from zero, the components of the proof can be interpolated directly. Although the method according to the invention has been explained using the example of a seven-color printing process, it can be applied, likewise, to the case in which, in addition to the four primary printing inks, printing is carried out with only one or two of the secondary printing inks. The first color profile (FIG. 12) then contains two four-dimensional association tables (five-color print) or three four-dimensional association tables (six-color print).

This application claims the priority, under 35 U.S.C. § 119, of German patent application No. 10 2004 003 300.5, filed Jan. 22, 2004; the entire disclosure of the prior application is herewith incorporated by reference.

I claim:

1. A method for producing a proof, which comprises:
utilizing a combination of the primary printing inks cyan, magenta, yellow, black and at least one secondary printing ink red, green, blue for an edition printing process;
utilizing proof printing inks cyan-P, magenta-P, yellow-P, black-P for a proof printing process;
converting the printing inks of the edition printing process with association tables into the printing inks of the proof printing process;
storing associated output color components in the association tables for combinations of input color components; and
dividing association tables having more than four input color components into a plurality of association tables having a maximum of four input color components.

2. The method according to claim 1, which further comprises printing, at no point on a printing material, more than four printing inks in the edition printing process.

3. The method according to claim 1, which further comprises printing at any point on a printing material no more than four printing inks in the edition printing process.

4. The method according to claim 1, which further comprises utilizing gray component replacement to replace proportions of the primary printing inks cyan, magenta, yellow with the primary printing ink black in the color separation for the edition printing process.

5. The method according to claim 4, which further comprises utilizing color component replacement to replace proportions of the primary printing inks cyan, magenta, yellow with one of the secondary printing inks red, green, blue in the color separation for the edition printing process.

6. The method according to claim 5, which further comprises selecting a factor of the gray component replacement and a factor of the color component replacement as a function of a chroma of a color to be printed.

7. The method according to claim 6, which further comprises applying a color component replacement only to a color to be printed to which a gray component replacement with a factor of 100% has already been applied.

8. The method according to claim 5, which further comprises applying a color component replacement only to a color to be printed to which a gray component replacement with a factor of 100% has already been applied.

9. The method according to claim 4, which further comprises selecting a factor of the gray component replacement as a function of a chroma of a color to be printed.

10. The method according to claim 1, which further comprises utilizing color component replacement to replace proportions of the primary printing inks cyan, magenta, yellow with one of the secondary printing inks red, green, blue in the color separation for the edition printing process.

11. The method according to claim 10, which further comprises selecting a factor of the color component replacement as a function of a chroma of a color to be printed.

12. The method according to claim 1, which further comprises first converting the printing inks of the edition printing process into a device independent color space and subsequently into the printing inks of the proof printing process.

13. The method according to claim 1, which further comprises containing the association tables in an ICC color profile.

14. The method according to claim 1, which further comprises converting the printing inks of the edition printing process directly into the printing inks of the proof printing process in one step.

15. A method for producing a proof, which comprises:
converting, with association tables, a combination of the primary printing inks cyan, magenta, yellow, black and at least one secondary printing ink red, green, blue of an edition printing process into proof printing inks cyan-P, magenta-P, yellow-P, black-P of a proof printing process by:
storing associated output color components in the association tables for combinations of input color components; and
dividing association tables having more than four input color components into a plurality of association tables having a maximum of four input color components.

16. The method according to claim 15, which further comprises printing at any point on a printing material no more than four printing inks in the edition printing process.

17. The method according to claim 15, which further comprises:
utilizing gray component replacement to replace proportions of the primary printing inks cyan, magenta, yellow with the primary printing ink black in the color separation for the edition printing process; and
utilizing color component replacement to replace proportions of the primary printing inks cyan, magenta, yellow with one of the secondary printing inks red, green, blue in the color separation for the edition printing process.

18. The method according to claim 17, which further comprises selecting a factor of the gray component replacement and a factor of the color component replacement as a function of a chroma of a color to be printed.

19. The method according to claim 18, which further comprises applying a color component replacement only to a color to be printed to which a gray component replacement with a factor of 100% has already been applied.

20. The method according to claim 17, which further comprises first converting the printing inks of the edition printing process into a device independent color space and subsequently into the printing inks of the proof printing process.

21. The method according to claim 17, which further comprises containing the association tables in an ICC color profile.

22. The method according to claim 17, which further comprises converting the printing inks of the edition printing process directly into the printing inks of the proof printing process in one step.

* * * * *